(12) United States Patent
Yura et al.

(10) Patent No.: US 10,197,825 B2
(45) Date of Patent: Feb. 5, 2019

(54) METHOD AND DEVICE FOR MANUFACTURING OPTICAL DISPLAY DEVICE

(71) Applicant: NITTO DENKO CORPORATION, Ibaraki-shi, Osaka (JP)

(72) Inventors: Tomokazu Yura, Ibaraki (JP); Satoru Koshio, Ibaraki (JP); Kiyotaka Tsutsumi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 128 days.

(21) Appl. No.: 15/025,204

(22) PCT Filed: Sep. 30, 2013

(86) PCT No.: PCT/JP2013/076468
§ 371 (c)(1),
(2) Date: Mar. 25, 2016

(87) PCT Pub. No.: WO2014/129004
PCT Pub. Date: Aug. 28, 2014

(65) Prior Publication Data
US 2016/0238861 A1 Aug. 18, 2016

(30) Foreign Application Priority Data
Sep. 25, 2013 (JP) ................................ 2013-197999

(51) Int. Cl.
*B32B 37/12* (2006.01)
*B32B 38/10* (2006.01)
(Continued)

(52) U.S. Cl.
CPC ............ *G02F 1/1303* (2013.01); *B32B 37/12* (2013.01); *B32B 38/0004* (2013.01);
(Continued)

(58) Field of Classification Search
CPC ..... B32B 37/12; B32B 38/0004; B32B 38/10; B32B 2037/268; B32B 2038/047;
(Continued)

(56) References Cited

U.S. PATENT DOCUMENTS

2009/0199950 A1* 8/2009 Kitada ............... B23K 26/0846
156/64
2011/0083789 A1* 4/2011 Nakazono ............... B32B 41/00
156/64

FOREIGN PATENT DOCUMENTS

| JP | 03215825 A | 9/1991 |
| JP | 2004333647 A | 11/2004 |

(Continued)

OTHER PUBLICATIONS

International Preliminary Report of Patentability dated Mar. 29, 2016 in connection with the counterpart International Patent Application No. PCT/JP2013/076468.
(Continued)

*Primary Examiner* — George R Koch
(74) *Attorney, Agent, or Firm* — Hauptman Ham, LLP

(57) ABSTRACT

A method and an apparatus for manufacturing an optical display device by sequentially peeling a plurality of optical film sheets continuously supported on a long web of a carrier film and laminating the plurality of optical film sheets to a plurality of panel components are provided. After completing laminating operation of a preceding optical film sheet to a preceding panel component, a rear end of next optical film sheet, supported on a carrier film which in a state where one of opposite surfaces thereof is folded to inside at a tip-end of a peeling member, is read at a predetermined detecting position as positional information, then a leading end of an optical film sheet is positioned at a predetermined laminat-
(Continued)

ing position based on the positional information while peeling the optical film sheet from the carrier film.

21 Claims, 13 Drawing Sheets

(51) Int. Cl.
  *G02F 1/13* (2006.01)
  *G02F 1/1335* (2006.01)
  *B32B 38/00* (2006.01)
  *G02F 1/1333* (2006.01)

(52) U.S. Cl.
  CPC ............ *B32B 38/10* (2013.01); *G02F 1/1335* (2013.01); *B32B 2457/202* (2013.01); *B32B 2551/00* (2013.01); *G02F 2001/133354* (2013.01); *G02F 2202/28* (2013.01)

(58) Field of Classification Search
  CPC .......... B32B 2309/10; B32B 2457/202; B32B 2551/00; G01F 1/1303; G01F 2001/133354; G01F 2202/28
  See application file for complete search history.

(56) References Cited

FOREIGN PATENT DOCUMENTS

| | | |
|---|---|---|
| JP | 4361103 B2 | 3/2009 |
| JP | 4377965 B1 | 12/2009 |

OTHER PUBLICATIONS

International Search Report dated Dec. 24, 2013 corresponding to International Application No. PCT/JP2013/076468.

* cited by examiner

FIG. 11

| Substrate | VEG01723NTB from Nitto Denko Corporation | CIG1484 CVAG350 from Nitto Denko Corporation | T-390 From Mitsubishi Plastics Inc. |
|---|---|---|---|
| Thickness (μm) | 213 | 131 | 38 |
| Peeling rate (m/min) | 0.6 | 0.6 | 0.6 |
| R | | | |
| 25 | △× | | |
| 22.5 | ○ | | |
| 20 | | | |
| 17.5 | | | |
| 15 | | × | |
| 10 | | △× | |
| 7.5 | | ○ | |
| 6.5 | | ○ | |
| 5 | | | |
| 4 | | | × |
| 2 | | | △× |
| 1.5 | | | ○ |
| 1 | | | ○ |

○ : Peelable
△× : Peelable but error occurred
× : Un-peelable (Reference)

METHOD AND DEVICE FOR MANUFACTURING OPTICAL DISPLAY DEVICE

CROSS REFERENCE TO RELATED APPLICATION

This application claims the priority of Japanese Patent Application No. 2013-197999, filed on Sep. 25, 2013 in the JPO (Japanese Patent Office). Further, this application is the National Phase application of International Application No. PCT/JP2013/076468 filed Sep. 30, 2013, which designates the United States and was published in Japanese.

TECHNICAL FIELD

The present invention relates to a method and an apparatus for manufacturing an optical display device. In particular, the present invention relates to a method and an apparatus, which use a peeling member having a tip-end, for manufacturing an optical display device for sequentially peeling a plurality of optical film sheets continuously supported via an adhesive layer on one of opposite surfaces of a carrier film together with the adhesive layer from the carrier film under peeling action of a peeling member and winding operation of a long web of a carrier film in a state where the other of opposite surfaces thereof is folded to inside at a tip-end of the peeling member and the carrier film is passed around the peeling member; and laminating the peeled optical film sheets to one of opposite surfaces of respective ones of panel components via the adhesive layer at a predetermined laminating position by using a laminating unit.

BACKGROUND ART

Patent Document 1 discloses a method and an apparatus, which use a peeling member having a tip-end, for peeling optical film sheets supported on a carrier film together with an adhesive layer from the carrier film under peeling action of the peeling member and winding operation of a long web of a carrier film which one of opposite surfaces thereof is folded to inside at the tip-end of the peeling member, and laminating the optical film sheets to respective one of panel components. Referring to FIG. 3 of Patent Document 1, there is shown a plurality of optical film sheets Xα, Xβ continuously supported via an adhesive layer 12 on one of opposite surfaces of a carrier film 13, and referring to FIG. 9 of Patent Document 1, there is shown a part of an apparatus for peeling the optical film sheet Xα together with an adhesive layer 12 from the carrier film 13 under peeling action of the peeling member and winding operation of a long web of a carrier film, and laminating the optical film sheet Xα to a panel component W at a lamination station B where an edge detecting unit 190 for detecting a leading end of the optical film sheet Xα at a tip-end of the peeling member 201 and a laminating unit 200 including lamination rollers are arranged.

Patent Document 2 also discloses a method and an apparatus, which use a peeling member having a tip-end, for peeling an optical film sheet supported on a carrier film together with an adhesive layer from a carrier film under peeling action of the peeling member and winding operation of a long web of a carrier film which one of opposite surfaces thereof is folded to inside at the tip-end of the peeling member, and laminating the plurality of optical film sheets to respective ones of panel components. Referring to FIG. 5 and FIG. 6 of the Patent Document 2, there are shown a part of the apparatus for laminating a plurality of optical film sheets F to respective ones of panel components W by activating lamination rollers 25, 26, when a leading end of the optical film sheet F with an adhesive layer partially peeled from a carrier film S at a tip-end of a peeling member 14 is protruded from the tip-end of the peeling member 14 to establish so-called "head-out" state and a laminating position of the panel component W is overlapped to a part of the optical film sheet F.

Patent Document 3 discloses a method and an apparatus for peeling an optical film sheet (i.e., film piece) 5 with an adhesive surface formed on a carrier film (i.e., a releasing film) 6 included in an optical film laminate (i.e., a band-shaped film) 4, thereby detecting a position of a leading end of the optical film sheet (i.e., film piece) 5 in a head-out state by a position detecting means 38, and correcting the position of the leading end of the optical film sheet 5 based on the detected positional information thereof.

Recently, a television mainly uses a liquid-crystal display device. A liquid-crystal (LC) cell for a television has a size of 18 inches (450 mm) even for a small one, and the size exceeds 60 inches (1500 mm) for a large one. Thickness of such LC cell is 1.4 mm which is 3 times or more than that of a LC cell for a slate-PC, and weight is 300 to 3,500 g. On the other hand, smartphones and tablet terminals are universally distributed as high-performance portable terminals with built-in battery. Those portable terminals are referred as slate-PCs, and in many cases, a middle- or small-sized liquid-crystal display device is used as an optical display device. A Liquid-crystal display panel used for a middle- or small-sized liquid-crystal display device in general is configured to include a LC cell with a size of about 5 to 10 inches (120 to 250 mm), a color filter (CF) arranged on a viewing side of a LC cell, and a thin-film transistor (TFT) arranged on a non-viewing side thereof, and thickness of a LC cell is about 0.5 mm and weight thereof is about 15 to 40 g.

Thus, processing capacity not required for a manufacturing system of liquid-crystal display device for a television is required for a manufacturing system of the middle- or small-sized liquid-crystal display devices used for such slate-PCs. For example, a process of laminating an optical film sheet comprising a polarizing film sheet to both of opposite surfaces of a liquid-crystal display panel requires laminating accuracy and manufacturing speed of two times higher than those of a manufacturing system of liquid-crystal display device for a television. Requirements for processing capacity of slate-PCs are different from those of a liquid-crystal display device for a television including, but not limited to, facilitating processing to reduce weight, minimizing contamination in a clean room surrounding an entire manufacturing line by minimizing dead-space and devising means and devices to facilitate processing an optical film laminate having a long-web of carrier film as a base.

That is, in case of middle- or small-sized liquid-crystal display devices used in slate PCs, a liquid-crystal display panel LC used therefor is small and light as a size of the liquid-crystal display panel LC is about ⅓ to ⅕ and a weight thereof is less than 1/20 of those of a large liquid-crystal display device. A roll of an optical film laminate based on a long web of a carrier film supporting a plurality of optical film sheets to be laminated to respective one of liquid-crystal display panel LCs is also narrow in width and ⅓ to 1/10 in weight. The roll is, for example, 500 mm in diameter, about 100 to 150 mm in width, and 30 to 70 kg in weight. Roll length of such an optical film laminate is about 900 m. However, manufacturing speed i.e., cycle time for such middle- or small-sized liquid-crystal display device is required to be two times higher than that for a large liquid-crystal display device, and laminating accuracy for an optical film sheet, such as a polarizing film supported on a carrier film, to be laminated to a liquid-crystal panel LC is also very severe.

A technical problem to be solved by the present invention is to achieve required laminating accuracy while maintaining cycle time required for laminating a panel component and an optical film sheet, and to provide a method and an apparatus for manufacturing an optical display device applicable to middle- and small-sized liquid-crystal display devices such as those used for slate-PCs.

A liquid-crystal display panel to be used as a panel component for a liquid-crystal display device of a slate PC is typically configured with, but not limited to, a liquid-crystal cell (LC) having two glass substrates with a liquid-crystal layer L filled therebetween, and a size of about 5 to 10 inches (120 to 250 mm), a thickness of about 0.5 mm and a weight of 15 to 40 g. Cycle time per a panel component is limited to some extent, and laminating accuracy allowed during the cycle time is at least about ±0.5 mm.

PRIOR ART DOCUMENTS

Patent Document 1: Japanese Patent No. 4377965B
Patent Document 2: Japanese Patent No. 4361103B
Patent Document 3: Japanese Laid-Open Patent Application No. 2004-333647A

DISCLOSURE OF THE INVENTION

Problem to be Solved by the Invention

An aim of the present invention is to provide a method and an apparatus for manufacturing an optical display device with high laminating accuracy, as mentioned above.

In order to achieve required laminating accuracy in manufacturing an optical display device, it is necessary to sequentially peel a plurality of optical film sheets continuously supported on one of opposite surfaces of the carrier film together with an adhesive layer from the carrier film under a winding operation of a long web of the carrier film which the other of opposite surfaces thereof is folded to inside by abutting at a tip-end of a peeling member and peeling action of the peeling member, while making a part of the optical film sheet protruded from the tip-end of the peeling member, and to precisely match a part of a separately conveyed panel component with the part of the optical film sheet establishing a head-out state at a predetermined laminating position.

As envisaged from Patent Documents 1 and 2, in order to satisfy the above-mentioned requirements, first of all, a leading end of the optical film sheet establishing the head-out state should be precisely positioned at the predetermined laminating position. Next, a panel component should be conveyed so as to match a part of the panel component, for example a lamination-start position thereof, with the leading end of the optical film sheet. Consequently, the panel component and the optical film sheet are laminated such that the optical film sheet appropriately fits to one of the opposite surfaces of the panel component. For this, it is necessary to confirm, on one hand, that a leading end of an optical film sheet is positioned to a predetermined laminating position and the optical film sheet is positioned to the predetermined laminating position based on the confirmed positional data of the leading end, and to ensure, on the other hand, that the optical film sheet is appropriately fit on one of opposite surfaces of a panel component conveyed to the predetermined laminating position.

However, it is not necessarily easy to minimize cycle time per panel component and to finish laminating accuracy at about ±0.5 mm. In many cases of manufacturing optical display devices, there will be difference generated in accuracy of positional data of a leading end of an optical film sheet depending on where to detect a leading end of an optical film sheet and/or how close a detecting means positioned thereto.

Various proposals are possible to minimize such lamination error. One example will be to detect a leading end of an optical film sheet by positioning to a detecting position provided on a peeling member which hardly generates error by winding a carrier film. However, cycle time per a panel component may have to be sacrificed in this case.

Normally, an optical film sheet establishing the head-out state is prone to curl or droop at its leading end. To access this, it is necessary to minimize a head-out length to detect a leading end and to feed the leading end to the predetermined laminating position after detecting, or to arrange the tip-end of the peeling member to a position in close proximity to the predetermined laminating position. However, in the former case, cycle time per a panel component will be sacrificed and in the latter case, it is apparent that there is a limit for such arrangement due to positional relationship with respect to a conveying channel of the panel component.

In optical display devices of middle- or small-sized liquid-crystal display devices used for slate-PCs, a protrusion length, i.e., a head-out length of a leading end of an optical film sheet is preferably about 5 to 100 mm, and more preferably 5 to 50 mm from a tip-end of a peeling member. Therefore, in order to reduce lamination error, the leading end of the optical film sheet needs to be precisely positioned at a predetermined laminating position by considering that the leading end of an optical film sheet is prone to curl or droop. The present invention is a result of challenging to such technical problems.

Means for Solving the Problem

The above-mentioned technical problem may be solved by, after completing lamination of an optical film sheet and a panel component, reading a rear end of a next optical film sheet supported on a carrier film in a state where one of opposite surfaces thereof is folded to inside at a tip-end of a peeling member and passed around the peeling member as positional information at a predetermined detecting position, and while peeling an optical film sheet from a carrier film, based on the positional information, determining winding length of the carrier film such that the rear end of the optical film sheet is positioned to a predetermined laminating position. By this, lamination error may be minimized without sacrificing cycle time per a panel component by leveling lamination error due to curl or droop generated at a leading end of an optical film sheet in a head-out state.

Embodiments of the present invention are as follows.

A first embodiment of the present invention is a method for manufacturing an optical display device 6 by sequentially peeling a plurality of optical film sheets 3 continuously supported on one of opposite surfaces of a long web of the carrier film 2, which configures an optical film laminate via an adhesive layer 4, together with the adhesive layer 4 from the carrier film 2, and laminating the plurality of optical film sheets 3 to one of opposite surfaces of respective ones of a plurality of panel components 5 via the adhesive layer 4 by using a laminating unit 50 at a predetermined laminating position 100.

The method comprises a feeding step of an optical film sheet to forwardly feed the optical film sheet 3 to a predetermined laminating position 100 while peeling the optical film sheet 3 together with an adhesive layer 4 from the carrier film 2 under winding operation of the carrier film 2 in a state where another surface thereof is folded to inside at a tip-end 61 configuring a head portion of a peeling member 60 provided in vicinity of the predetermined laminating position 100 and the carrier film being passed around the peeling member and under peeling action of the peeling member 60.

The method further comprises a step of reading a rear end of an optical film sheet by operating a detecting means 70 to read a rear end 31 as positional information 310 at a predetermined detecting position 200 for detecting the rear end 31 of the optical film sheet 3 supported on the carrier film 2; and a step of conveying a panel component to forwardly feed the panel component 5 to be laminated to the optical film sheet 3 from a predetermined waiting position 300 to the predetermined laminating position 100.

The method further comprises a step of laminating a panel component 5 and an optical film sheet 3 via an adhesive layer 4 by a laminating unit 50 at the predetermined laminating position 100 while further peeling the optical film sheet 3 together with the adhesive layer 4 from the carrier film 2 and forwardly feeding the optical film sheet 3 to the predetermined laminating position 100, based on the read positional information 310 of the rear end 31 of the optical film sheet 3.

In the first embodiment, there may be included a step of positioning a leading end of an optical film sheet to position the leading end 32 of the optical film sheet to the predetermined laminating position 100 based on the read positional information 310 of the rear end 31 of the optical film sheet 3 supported on the carrier film 2.

There may also be included a step of switching the laminating unit 50 to non-active after completing laminating operation of the optical film sheet 3 and the panel component 5 and switching the laminating unit 50 to active when starting a next laminating operation of the optical film sheet 3 and the panel component 5. The laminating unit 50 may be configured from open/close lamination rollers 51, 52 which are operable to open/close to upward/downward direction. In the embodiment, the laminating rollers 51, 52 may be opened after completing laminating operation of the optical film sheet 3 and the panel component 5 to form space 400 as well as the laminating unit 50 is switched to non-active and the laminating rollers 51, 52 may be closed to close the space 400 when starting a next laminating operation of the optical film sheet 3 and the panel component 5 as well as the laminating unit 50 may be switched to active.

In the first embodiment, a panel component 5 may be rectangle-shaped and have a rectangular laminating surface 500 on a surface which an optical film sheet 3 is laminated thereto, leaving at least an edge part along a long side A and/or a short side B of the panel component 5, and there may be included a step of matching the long side a or the short side b of the laminating surface 500 which is to be a lamination start position of the panel component 5 to the leading end 32 of the optical film sheet.

In the first embodiment, there may be included a step of synchronizing conveying operation of a panel component 5 forwardly fed to a predetermined laminating position 100 and winding operation of a carrier film 2 for forwardly feeding an optical film sheet 3 to a predetermined laminating position 100.

In the first embodiment, a detecting means may be configured to read opposing edges 311, 312 configuring a rear end 31 of an optical film sheet 3 supported on a carrier film 2 as positional information 310. Further, the detecting means 70 may comprise a plurality of imaging devices 71, 72 having a measurement reference. In the embodiment, the imaging devices 71, 72 are operated to read the opposing edges 311, 312 which the rear end 31 of the optical film sheet 3 supported on the carrier film 2 as positional information to generate the positional information 310.

In the first embodiment, a carrier film feeding means 80 including forward/reverse feed rollers 81, 82 arranged at upstream and at downstream of a tip-end 61 of a peeling member 60 may be operated to wind the carrier film 2 without slacking. In the embodiment, the carrier film feeding means 80 may forwardly or backwardly feed a rear end 31 of an optical film sheet 3 supported on the carrier film 2 to position the rear end 31 of the optical film sheet 3 to a predetermined detecting position 200 by winding or unwinding the carrier film 2 without slacking based on positional information 310 of the rear end 31 of the optical film sheet 3 supported on the carrier film 2. More particularly, when the rear end 31 of the optical film sheet 3 stops at a position not arriving or exceeding the predetermined detecting position 200, the rear end 31 of the optical film sheet 3 is forwardly or backwardly fed, so that deviation (δ) of the rear end 31 from the predetermined detecting position 200 may be corrected.

In the first embodiment, a panel component detecting means 91 may be provided at a predetermined waiting position 300 to detect a panel component 5 conveyed to the predetermined waiting position 300.

In the first embodiment, a panel component position-adjusting means 92 may be provided at a predetermined waiting position 300 to adjust position and posture of a panel component 5. More particularly, position and posture of the panel component 5 conveyed to a predetermined laminating position 100 by a panel component conveying means 90 may be pre-adjusted at the predetermined waiting position 300.

A second embodiment of the present invention is an apparatus 10 for manufacturing an optical display device 6 by sequentially peeling a plurality of optical film sheets 3 continuously supported on one of opposite surfaces of a long web of a carrier film 2 via the adhesive layer 4 which configures an optical film laminate 1, together with the adhesive layer 4 from the carrier film 2; and laminating the plurality of optical film sheets 3 to one of the opposite surfaces of respective ones of a plurality of panel components 5 via the adhesive layer 4 at a predetermined laminating position 100.

The apparatus 10 is configured with units as follows.

The apparatus 10 comprises:
  a laminating unit 50 arranged at a predetermined laminating position 100 and operating to laminate an optical film sheet 3 and a panel component 5 via an adhesive layer 4;
  a peeling member 60 arranged adjacently to the laminating unit 50 in vicinity of the predetermined laminating position 100 and comprising a tip-end configuring a head portion which acts to forwardly feed the optical film sheet 3 to the predetermined laminating position 100 while peeling the optical film sheet 3 together with the adhesive layer 4 from the carrier film 2 by winding the carrier film 2 and a body 62 where another surface of the carrier film 2 is folded to inside at the tip-end 61 and the carrier film 2 is passed therearound;

a carrier film feeding unit 80 operating to wind the carrier film 2 without slacking which another surface thereof is folded to inside at the tip-end 61 and is passed around the body 62; a panel component conveying unit 90 operating to forwardly feed the panel component 5 from a predetermined waiting position 300 to the predetermined laminating position 100; and, a control unit 800 associating and operating each of the laminating unit 50, the carrier film feeding unit 80, the detecting unit 70, and the panel component conveying unit 90 and, based on the positional information 310 of the rear end 31 of the optical film sheet 3 supported on the carrier film 2 which is read as positional information at the predetermined detecting position 200, to laminate the optical film sheet 3 and the panel component 5 via the adhesive layer 4 at the predetermined laminating position 100, while further peeling the optical film sheet 3 together with the adhesive layer 4 from the carrier film 2 under winding operation of the carrier film 2 and peeling action of the peeling member 60.

In the second embodiment, a panel component 5 may be rectangle-shaped and have a rectangular laminating surface 500 on a surface which an optical film sheet 3 is laminated thereto, leaving at least an edge part along a long side a and/or a short side b of the panel component 5, and the control unit 800 may operate to match the long side A or the short side B of the laminating surface 500 which is to be a lamination start position of the panel component 5 to the leading end 32 of the optical film sheet.

In the second embodiment, the control unit 800 may interlockingly operate the carrier film feeding unit 80 and the panel component conveying unit 90 to synchronize operation of forwardly feeding the optical film sheet 3 to the predetermined laminating position 100 and forwardly feeding the panel component 5 to the predetermined laminating position 100.

In the second embodiment, a laminating unit 50 comprises open/close lamination rollers 51, 52 which are operable to open/close to upward/downward direction, and the control unit 800 may operate the laminating rollers 51, 52 to open after completing laminating operation of the optical film sheet 3 and the panel component 5 to form space 400 as well as to switch the laminating unit 50 to non-active, and to operate the laminating rollers 51, 52 to close to close the space 400 when starting a next laminating operation of the optical film sheet 3 and the panel component 5 as well as to switch the laminating unit 50 to active.

In the second embodiment, the carrier film feeding means 80 is configured with forward/reverse feed rollers 81, 82 arranged at upstream and at downstream of a tip-end 61 of a peeling member 60, and the control unit 800 may operate the forward/reverse feed rollers 81, 82 to wind or unwind the carrier film 2 without slacking. The carrier film feeding means 80 may further be configured with a dancer roller between one of the forward/reverse feed roller 81 and the peeling member 60, and the dancer roller may be interlockingly operated with another of the forward/reverse feed roller 82 to wind or unwind the carrier film 2 without slacking.

In the second embodiment, the detecting unit 70 includes a plurality of imaging devices 71, 72 having measurement reference 700 arranged at positions corresponding to positions corresponding to opposing edges 311, 312 of a rear end 31 of an optical film sheet 3 supported on a carrier film 2, and the control unit 800 may operate the imaging devices 71, 72 to read the opposing edges 311, 312 as positional information based on the measurement reference 700.

In the second embodiment, a panel component detecting unit 91 is arranged at a predetermined waiting position 300, and the control unit 800 may operate the panel component detecting unit 91 to detect the panel component 5 conveyed to the predetermined waiting position 300.

In the second embodiment, a panel component position-adjusting unit 92 is arranged at the predetermined waiting position 300, and the control unit 800 may operate the panel component position-adjusting unit 92 to pre-adjust position and posture of the panel component 5 conveyed to the predetermined laminating position 100 by the panel component conveying unit 90 at the predetermined waiting position 300.

BRIEF DESCRIPTION OF THE DRAWINGS

FIG. 1(c) is a schematic diagram illustrating positional relationship between a panel component and an optical film sheet where the long side or the short side of the laminating surface which is to be a lamination-start position of the panel component is matched with a leading end of an optical film sheet.

FIG. 3 is a schematic side view showing a long web of carrier film being wound via a peeling member having a tip end by a carrier film feeding unit. FIG. 3 also shows a detecting unit for reading a rear end of an optical film sheet supported on a carrier film, and a panel component conveying unit for conveying panel components from a predetermined waiting position to a predetermined laminating position.

FIG. 11 is a table showing experiment results on samples of substrates with an adhesive layer, having a width of 50 mm and three different thicknesses.

BEST MODE FOR IMPLEMENTING THE INVENTION (Outline of a Method for Manufacturing an Optical Display Device and an Apparatus Therefor)

Figure 1:
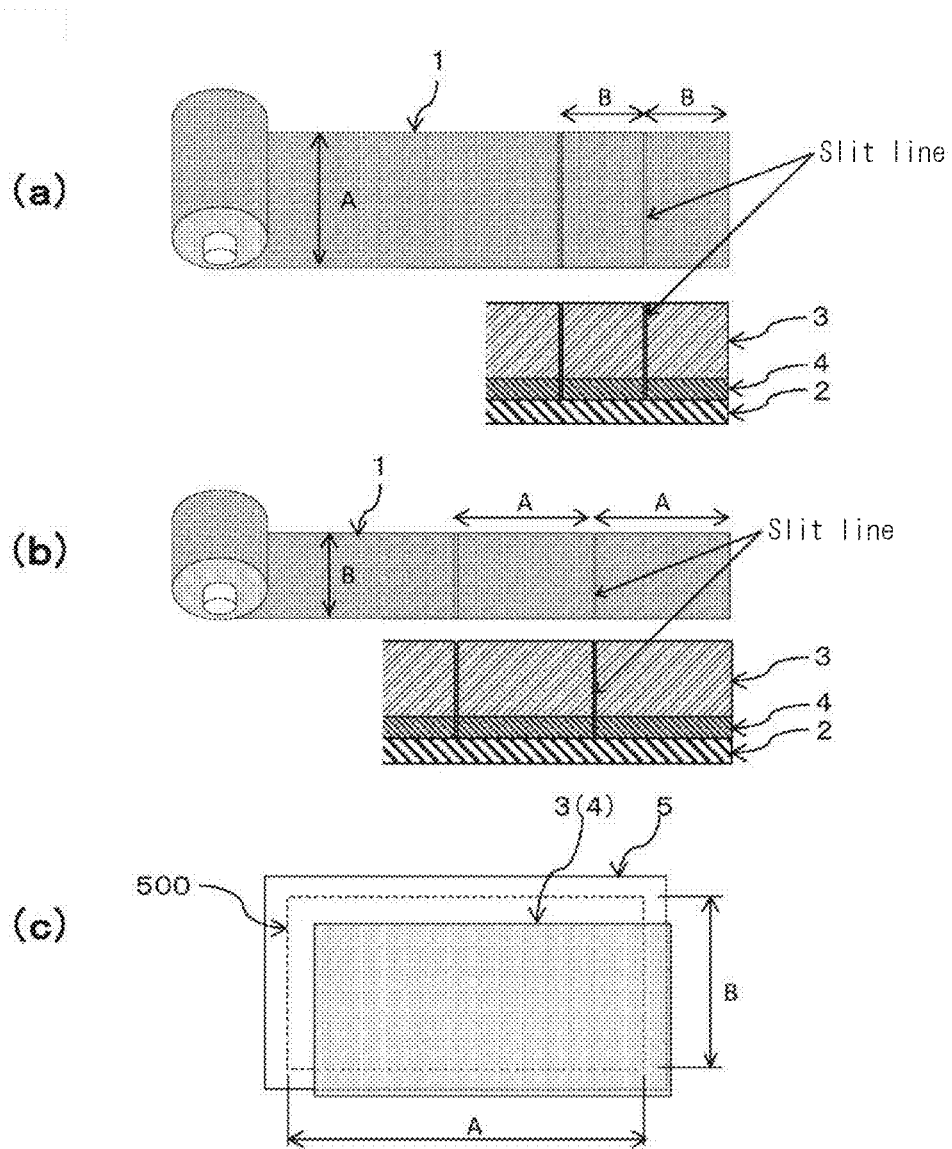
FIG. 1 illustrates a plan view and a side view showing an example of an optical film laminate comprising a plurality of continuous optical film sheets together with an adhesive layer on a long web of a carrier film. Each of FIGS. 1(a) and (b) shows an example of the optical film laminate in which a plurality of optical film sheets continuously supported on one of opposite surfaces of a long web of the carrier film which has a width corresponding to a long side or a short side of a laminating surface of a rectangular panel component.
Figure 2:
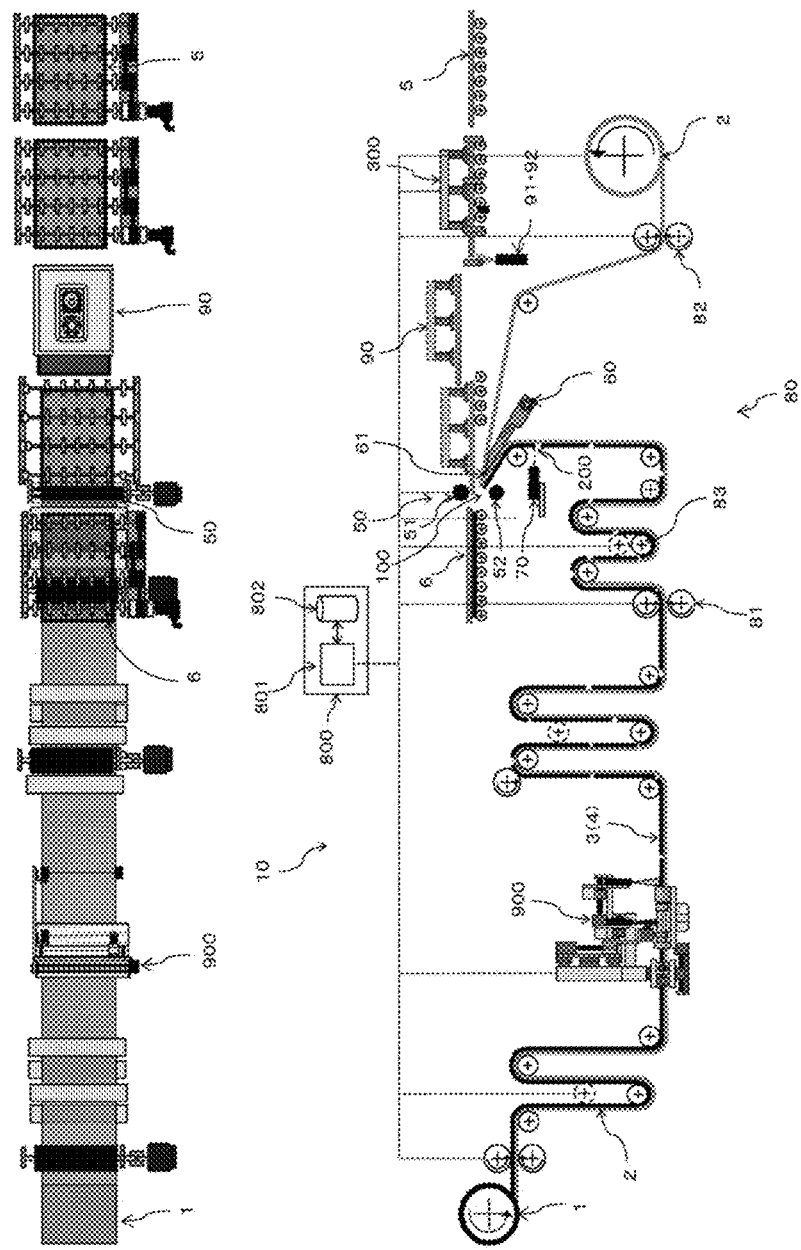
FIG. 2 illustrates a schematic top view and a schematic side view showing an entire apparatus for manufacturing an optical display device by laminating an optical film sheet and a panel component via an adhesive layer with a laminating unit including a pair of lamination rollers at a predetermined laminating position.

FIG. 2 illustrates a top view and a side view showing an entire apparatus 10 for manufacturing an optical display device 6 by laminating an optical film sheet 3 and a panel component 5 at a predetermined laminating position 100. As shown in FIG. 1, the optical film sheet 3 including an adhesive layer 4 is formed by forming a plurality of slit lines by a slitting unit 900 shown in FIG. 2 on an optical film laminated together with an adhesive layer 4 on one of opposite surfaces of a long web of a carrier film 2 which configures an optical film laminate 1 with a width corresponding to a long side A or a short side B of a laminating surface 500 formed by leaving edges at a long side a and a short side b of the panel component 5 having rectangular shape.

The apparatus 10 used in an embodiment of the present invention may be, for example but not limited to, an apparatus configuring a part of a manufacturing system of liquid-crystal display devices for slate-PCs. The manufacturing system has, but not limited to, a linear channel and dimension of the channel is assumed as about 210 to 550 mm in width and about 5000 to 6000 mm in length. Preferably, the linear channel is configured for a height where an operator can visually identify panel components 5 fed from a right end of the channel, a roll R of the optical film laminate 1 can be mounted at a left end of the channel, and the operator can visually identify a slitting unit 900 forming a plurality of slitting lines on the optical film laminated together with the adhesive layer 4 on one of opposite surfaces of a long web of the carrier film 2 which configures the optical film laminate 1, to continuously form a plurality of optical film sheets 3 with the adhesive layer 4. The slitting unit 900 may be omitted when using an optical film laminate 1 in which optical film sheets 3 with an adhesive layer 4 are preliminary formed on one of opposite surfaces of a long web of carrier film 2.

The apparatus 10 is arranged in a clean room as well-known to those skilled in the art. In a clean room, it is preferable that the manufacturing system is covered with a box-type housing with an operable door or window to maintain high-level cleanness in order to eliminate, as much as possible, adhesion of dirt etc brought by workers and/or operators to the adhesive layer 4 of the optical film sheet 3 to be laminated to one or both surfaces of the panel component 5. From such view point, it is more preferable to arrange the channel in a hierarchical structure to prevent the panel components 5 passing over the optical film laminate 1 and further to locate the predetermined laminating position 100 to satisfy both of positional arrangements for feeding the optical film sheets 3 continuously supported on the carrier film 2 and for feeding of the panel components 5, to provide an optimal configuration which can be housed in the box-type housing in an arrangement allowing for exerting given performance.

Figure 3:
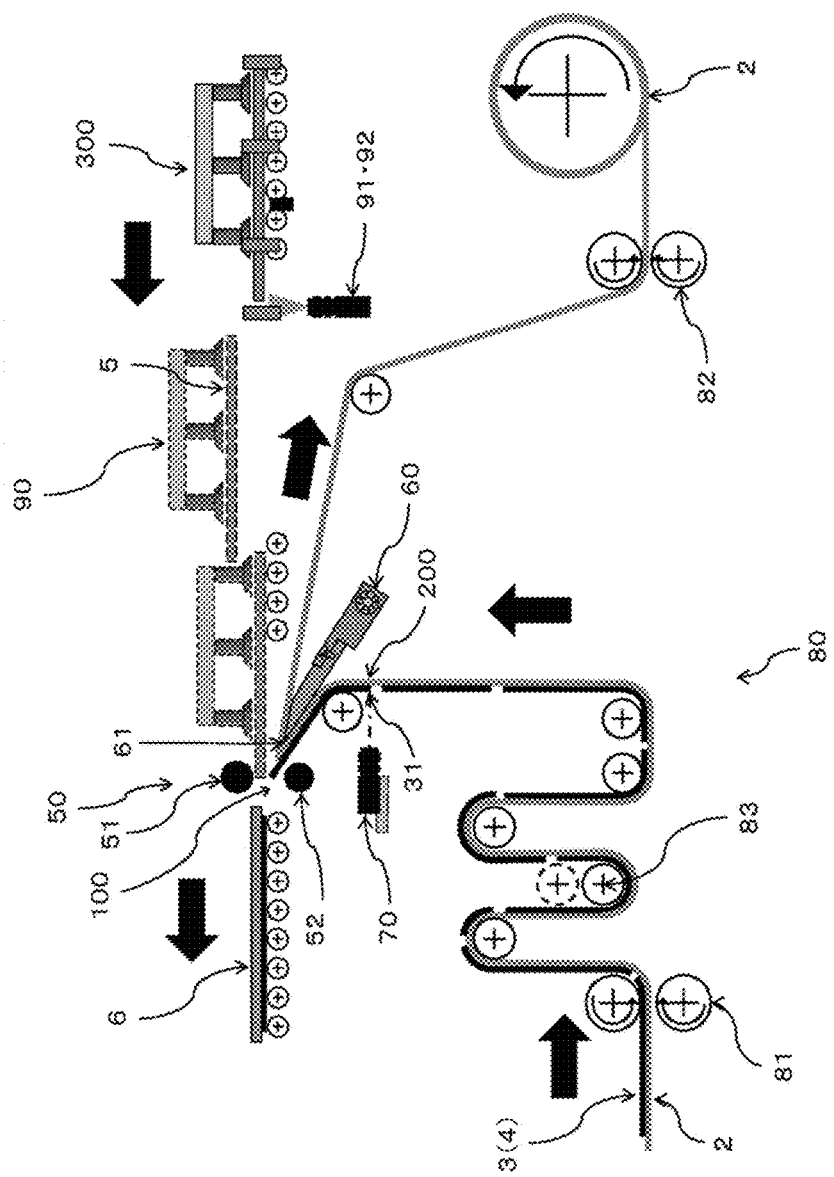
FIG. 3 illustrates enlarged views of a predetermined laminating position 100 where a laminating unit shown in FIG. 2, including lamination rollers configured to laminate and to open/close in upward/downward direction with respect to feeding direction, is activated.

FIG. 3 is enlarged views of a predetermined laminating position 100 where a laminating unit 50 shown in FIG. 2, including lamination rollers 51, 52 configured to laminate and to open/close in upward/downward direction with respect to feeding direction, is activated. FIG. 3 is a schematic side view showing a long web of carrier film being wound via a peeling member having a tip end by a carrier film feeding unit 80. FIG. 3 also shows a detecting unit 70 for reading a rear end 31 of an optical film sheet 3 supported on a carrier film 2, and a panel component conveying unit 90 for conveying panel components 5 from a predetermined waiting position 300 to a predetermined laminating position 100 while peeling a leading end 32 of the optical film sheet 3 under peeling action of a tip-end 61.

Figure 13:
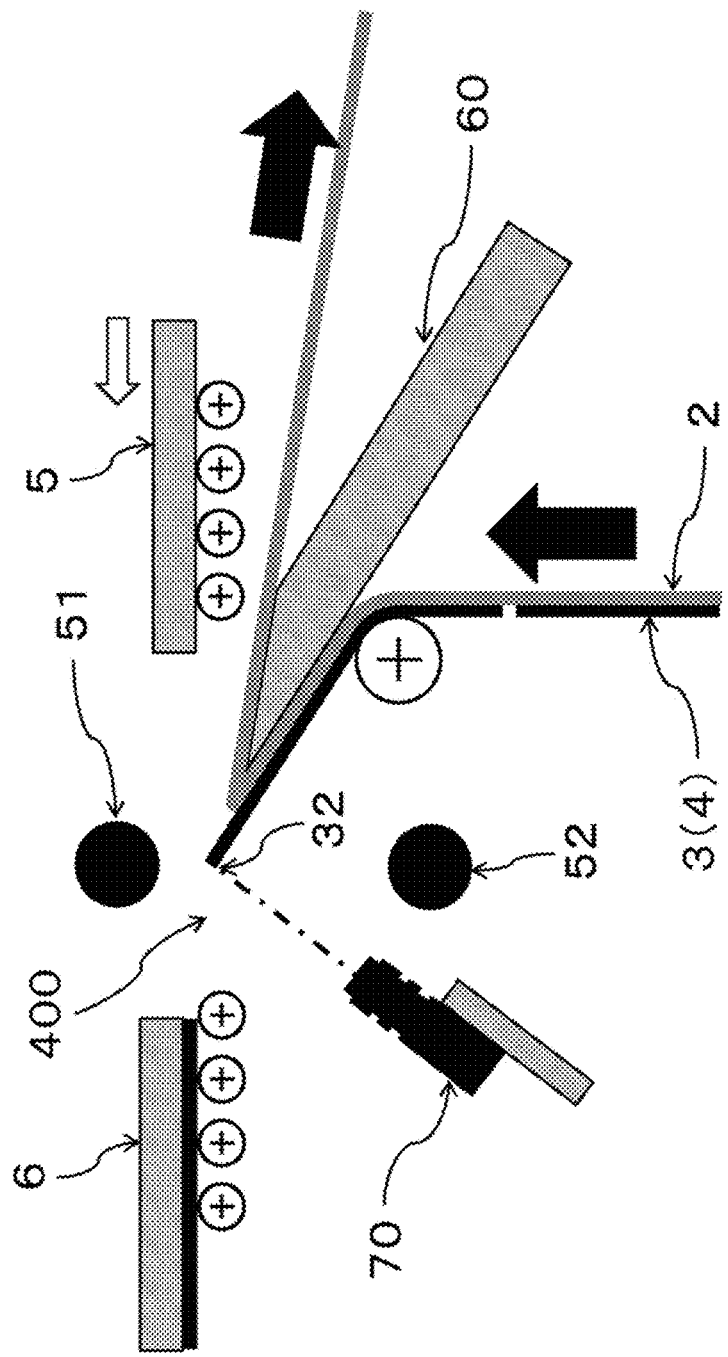
FIG. 13 is an enlarged view showing a laminating unit in which lamination rollers of different configuration from the laminating unit shown in FIG. 3 are opened to upward/downward direction, which shows a state where a leading end of an optical film sheet is read by a detecting unit which is advancable/retractable to/from a space formed by the opened lamination rollers at a predetermined laminating position.

FIG. 13 is an enlarged view showing a laminating unit 50' different from a laminating unit 50 shown in FIG. 3, in which lamination rollers 51', 52' configured to be operated to laminate an optical film sheet 3 and a panel component 5 and to be open/close in upward/downward direction are opened, forms a space 400 at a predetermined laminating position 100, and a detecting unit 70' different from a detecting unit 70 of the present invention which is moved to the space 400 for reading a leading end of the optical film sheet 3.

FIG. 1(c) is a schematic view showing positional relationship for laminating an optical film sheet 3 and a panel component 5 at the predetermined laminating position 100 where a leading end 31 of the optical film sheet 3 is matched to a long side A or a short side B of a laminating surface 500 which is to be a laminating start position of the panel component 5. As is clear from FIG. 1(c), for example, in order not to generate any deviation between a leading end 32 of an optical film sheet 3 where a head-out state of preferably 5 to 100 mm and more preferably 5 to 50 mm from a tip-end 61 of a peeling member 60 is established under peeling action of the tip-end 61 of the peeling member 60 and the laminating surface 500 of the panel component 5, a rear end 31 of the optical film sheet 3 is precisely positioned to a predetermined detecting position 200 in a state supported on a carrier film 2 to ensure a reading operation thereat. Then, winding amount of the carrier film 2, and timing and amount for conveying the panel component 5 are controlled based on the read positional information 310 of the rear end 31 of the optical film sheet 3.

(Outline of a Method for Manufacturing an Optical Display Device 6 and an Apparatus Therefor)

Figure 4:
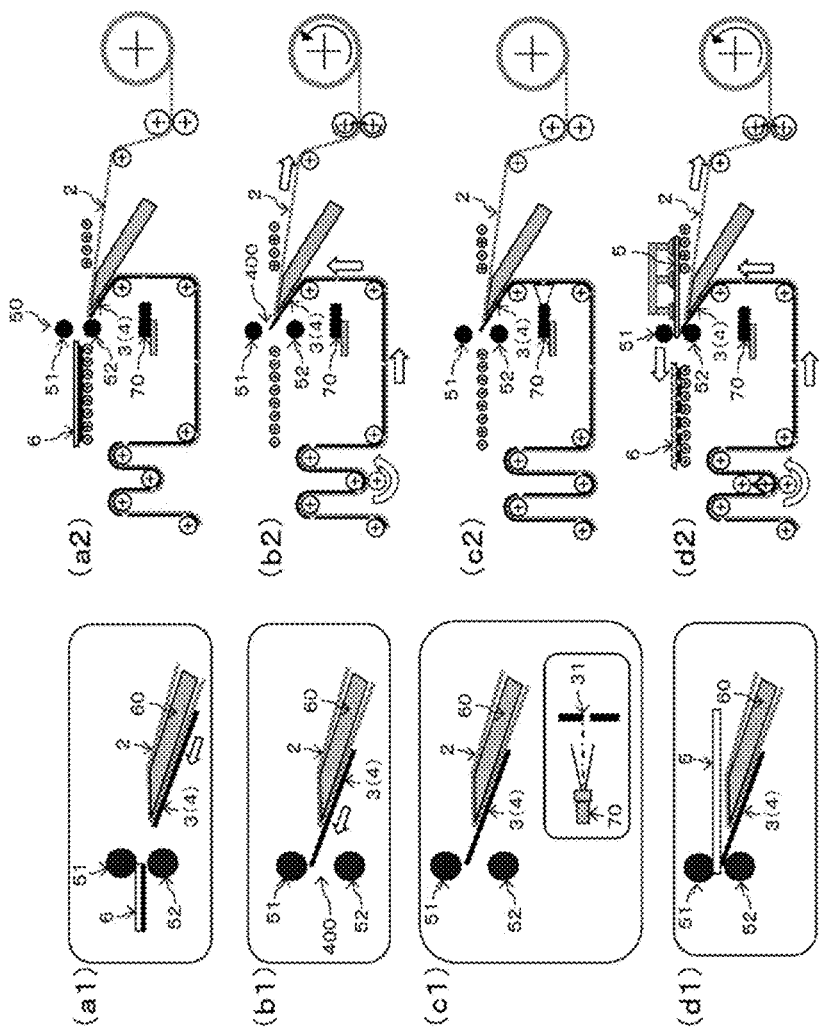
FIG. 4 is a schematic view showing operation steps to read a rear end of an optical film sheet supported on a carrier film at a predetermined detecting position while peeling the optical film sheet from the carrier film and forwardly feeding a leading end of the optical film sheet to a predetermined laminating position, as shown in FIG. 2.
Figure 6:
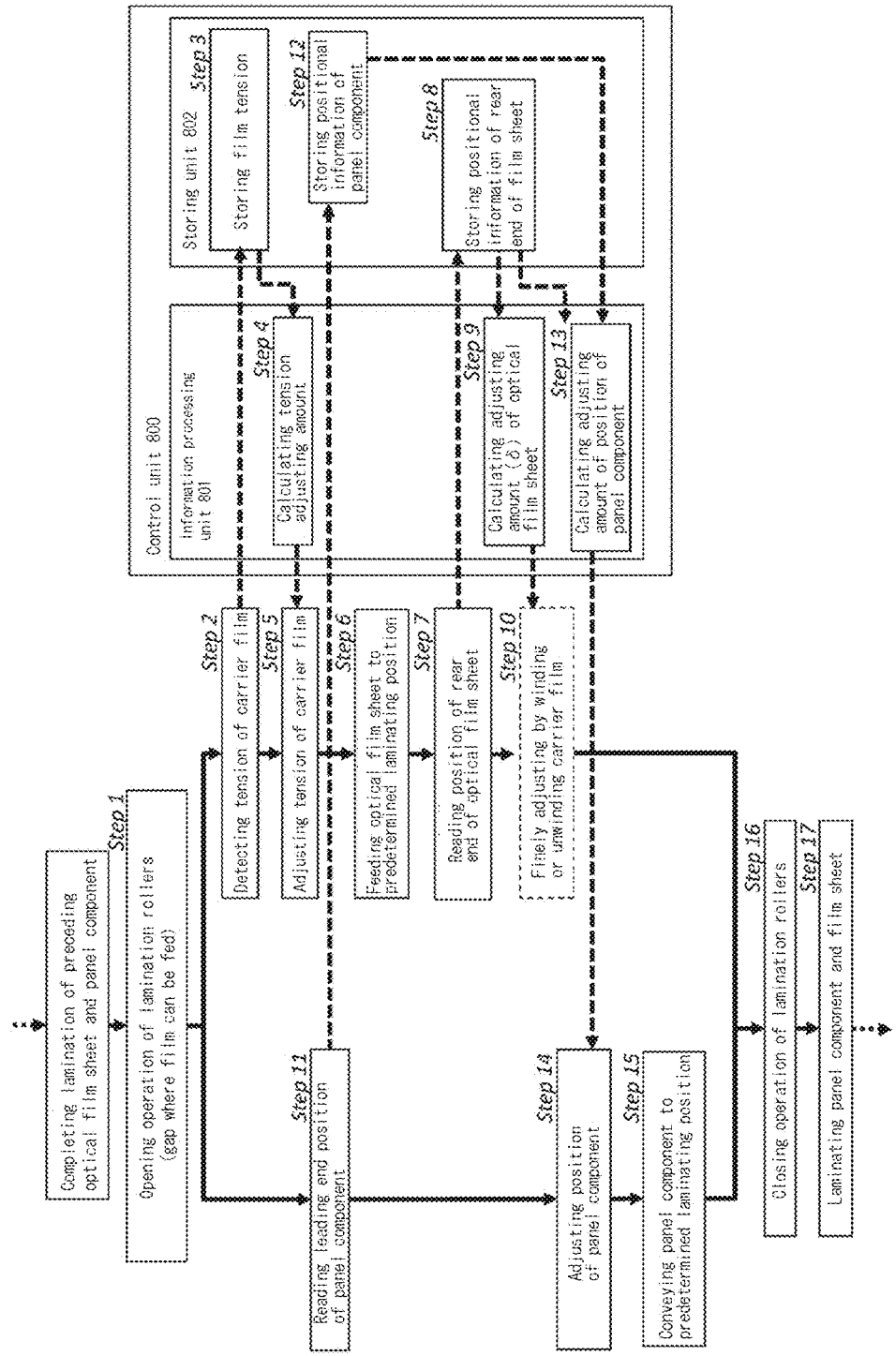
FIG. 6 illustrates a control flow chart representing a manufacturing process of an apparatus for manufacturing an optical display device, by operating lamination rollers configured to laminate and to open/close in upward/downward direction with respect to feeding direction, as shown in FIG. 4.

A method for manufacturing optical display device 6 according to the present invention is characterized by operation steps (a) to (d) shown in FIG. 4. A flow chart of operation steps corresponding to FIG. 4 is shown in FIG. 6.

An operation step (a1) in FIG. 4 shows a state immediately after laminating a preceding optical film sheet 3 and a preceding panel component 5. As is clear therefrom, a rear end part of a preceding optical display device 6 immediately after lamination is sandwiched by lamination rollers 51, 52 of a laminating unit 50.

On the other hand, as is clear from an operation step (a2), an optical film sheet 3 to be laminated next to a panel component 5, the optical film sheet 3 being supported on a carrier film 2 which is passed around a peeling member 60, is positioned as a leading end 32 thereof together with an adhesive layer 4 being retained at a tip-end 61 of the peeling member 60.

When laminating operation of a preceding optical film sheet 3 and a preceding panel component 5 is completed, as is clear from an operation steps (b1) and (b2) shown in FIG. 4, the lamination rollers 51, 52 of the laminating unit 50 are opened and a space 400, necessary at least for feeding the film sheet 3 to be laminated next to the panel component 5, is formed. Then, the laminating unit 50 may be appropriately switched to non-active.

As will be described in detail later, a space 400, formed at a predetermined laminating position 100 by a laminating unit 50' different from the laminating unit 50 of the present invention, is for reading a leading end 32 of the optical film sheet 3 as positional information through the space 400 with or without moving a detecting unit 70 to the space 400.

In comparison with the above, a space 400 formed by a laminating unit 50 of the present invention is not a space 400 for detecting a leading end 32 of an optical film sheet 3, but is what assumes to be a gap which is sufficient at least to feed the optical film sheet 3 and a panel component 5 to a predetermined laminating position 100. An operation step 1 shown in FIG. 6 shows such opening operation of laminating rollers 51, 52.

Next, referring to steps 2 to 5 of FIG. 6 associated with feeding operation of a carrier film 2, they consist of steps of adjusting tension of a carrier film 2 such that the carrier film 2 may be feed without slacking when to wind or to stop winding the carrier film 2 while maintaining a constant tension without slacking. In particular, in the step 2, tension of the carrier film is constantly detected, in the steps 3 and 4, adjusting amount is calculated based on tension stored as a reference, and in the step 5, the tension of the carrier film 2 is adjusted with the calculated adjusting amount.

As is clear from operation step (c2) shown in FIG. 4, the carrier film 2 is wound in a direction of arrow, thereby the optical film sheet 3 is fed to the predetermined laminating position 100 where the space 400 is formed by opening operation of the lamination rollers 51, 52 while the optical film sheet 3 being peeled together with the adhesive layer 4 from the carrier film 2 under peeling action of the peeling member 60. This is the step 6 shown in FIG. 6.

As is clear from operation step (c1) shown in FIG. 4, a leading end 32 of the optical film sheet 3 is then forwardly fed to or close to the predetermined laminating position 100, while a rear end 31 of the optical film sheet 3 supported on the carrier film 2 arrives at or close to a predetermined detecting position 200 where the rear end 31 is read as positional information 310 by a detecting unit 70.

The rear end 31 of the optical film sheet 3 is read at the predetermined detecting position 200 as the positional information 310 by the detecting unit, as being supported on the carrier film 2. Step 7 in FIG. 6 shows position reading of the rear end 31 of the optical film sheet 3. As shown in step 8 in FIG. 6, the read positional information 310 of the rear end 31 is stored in a storing unit 802.

By the way, an embodiment shown in FIG. 13 of reading a leading end 32 of an optical film sheet 3 to generate positional information 310 is different from the embodiment of the present invention in that, in addition to open/close operation of lamination rollers 51, 52, the leading end 32 of the optical film sheet 3 should be read as positional information through a space 400 with or without moving a detecting unit 70 to the space 400. Further, it is required to detect the leading end 32, at every time of detecting, after adjusting curl or droop of the leading end 32 in head-out state after being peeled from the carrier film 2. Thus, it is difficult to improve accuracy as positional information and to significantly reduce cycle time per a panel component required for reading the leading end 32.

A rear end reading method of an embodiment of the present invention for reading a rear end 31 of an optical film sheet 3 in a state being supported on a carrier film 2 is what solves problems of such a leading end reading method in one.

Figure 8:
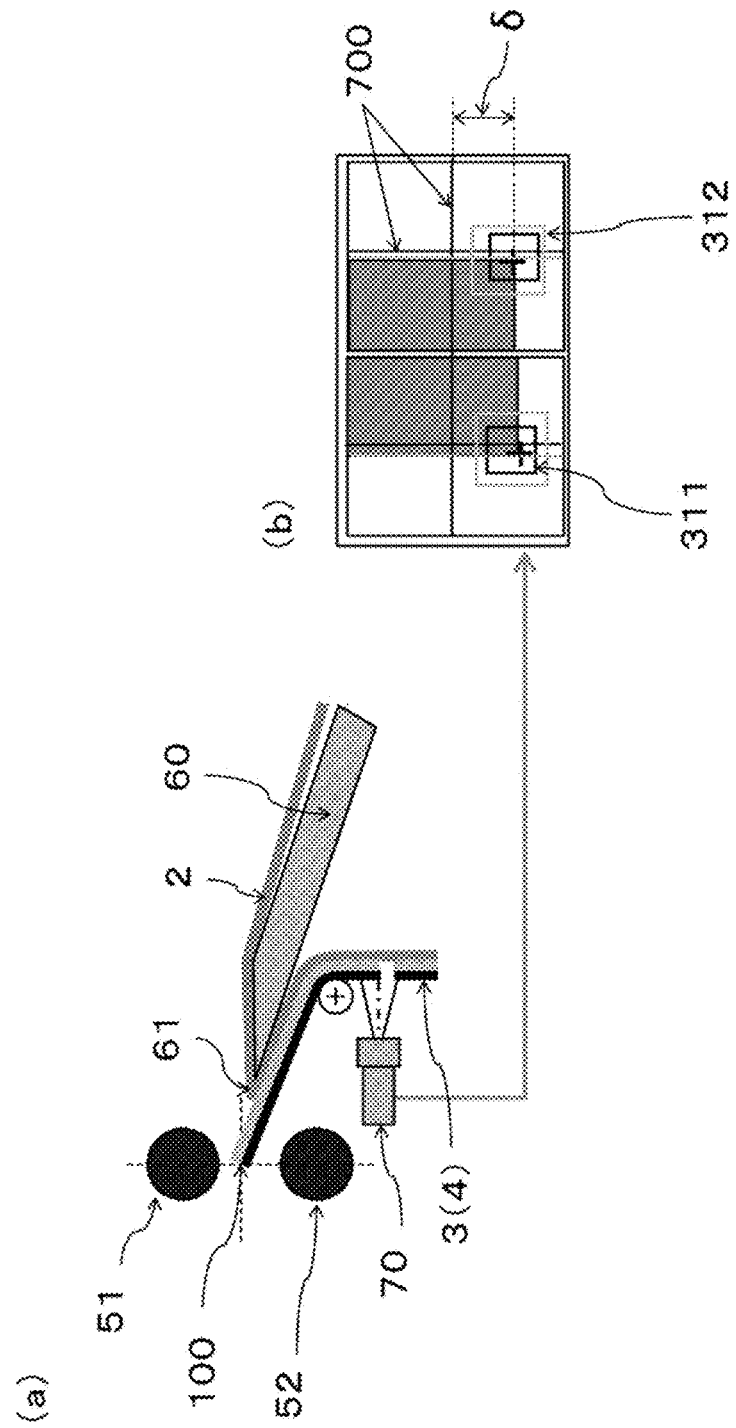
FIG. 8 is a schematic view showing a relationship between opposing edges positional information read by a detecting unit and measurement reference which imaging devices arranged at the detecting unit have, with respect to opposing edges of a rear end of an optical film sheet at a predetermined detecting position, as shown in FIG. 2.

Detail of the rear end reading method will be clear from steps 9 and 10 shown in FIG. 6 and from FIG. 8. Referring to FIG. 8, when it is confirmed as there is deviation (δ) between opposing edges 311, 312 representing a rear end 31 of an optical film sheet and a predetermined detecting position 200, adjusting amount (δ) of the optical film sheet 3 is calculated (step 9). Then, based on the adjusting amount (δ), the optical film sheet 3 is finely adjusted as forwardly or backwardly fed by winding or unwinding of the carrier film 2 (step 10). By the above, a head-out state is formed with proper stroke at the predetermined laminating position 100. Head-out amount of the leading end 32 is between a tip-end 61 and the predetermined laminating position 100, and is preferably 5 to 100 mm and more preferably 5 to 50 mm from the tip-end 61 of the peeling member 60.

As is clear from operation step (c1) shown in FIG. 4, while a rear end 31 of an optical film sheet 3 is properly positioned to a predetermined detecting position 200, a leading end 32 of the optical film sheet is peeled together with an adhesive layer 2 from a carrier film 2 and thereby, is properly positioned to a predetermined laminating position 100. At this time, a panel component 5 is conveyed to a predetermined waiting position 300 and properly positioned. In particular, it is clarified by steps 11 to 15 shown in FIG. 6.

Referring to the steps 11 to 15 shown in FIG. 6 which are associated with conveying operation of a panel component 5 from a predetermined waiting position 300 to a predetermined laminating position 100 shown in FIG. 3, these steps consist of, for example, firstly, step 11 where a panel component detecting unit 91 and a panel component position adjusting unit 92 arranged at the predetermined waiting position are activated to detect the panel component 5 conveyed to the predetermined waiting position 300, step 12 where a leading end position of the panel component 5 is read and stored as positional information 510 of the panel component 5, step 13 where position adjusting amount of the panel component 5 is calculated based on the positional information 510 of the panel component 5, and step 14 where the panel component position adjusting nit 92 is operated for the calculated position adjusting amount to adjust position of the panel component 5 at the predetermined waiting position 300. As is clear from FIG. 3, the panel component properly positioned at the predetermined waiting position 300 is conveyed by the panel component conveying unit 90 from the predetermined waiting position 300 to the predetermined laminating position 100.

As is clear from step (d1) and (d2) shown in FIG. 4, the panel component 5 conveyed to the predetermined laminating position 100 is control such that one side of a laminating surface 50', which is to be a laminating start position of the panel component 5, is matched to the leading end 32 of the optical film sheet 3 where head-out state is established when the panel component 5 arrives at the space 400 formed at the predetermined laminating position 100.

When the panel component 5 is matched to the leading end 32 of the optical film sheet 3, the lamination rollers 51, 52 are closed and the laminating unit 50 is switched to active as shown in FIG. 6. Thereby, as is clear from step 17 shown in FIG. 6, laminating operation of the optical film sheet 3 and the panel component 5 via the adhesive layer 4 is started while further peeling the optical film sheet 3 together with the adhesive layer 4 from the carrier film 2 under peeling action of the peeling member 60. For this, a control unit 800 of the apparatus 10 associates and controls laminating operation of the laminating unit 50, operation of the detecting unit 70, winding or unwinding operation of the carrier film 2 by the carrier film feeding unit 80 including the forward/reverse rollers 81, 82 and operation of the panel component conveying unit 90, as is clear from a flow chart shown in FIG. 6.

(Outline of Another Method for Manufacturing an Optical Display Device 6 and an Apparatus Therefor)

Figure 5:
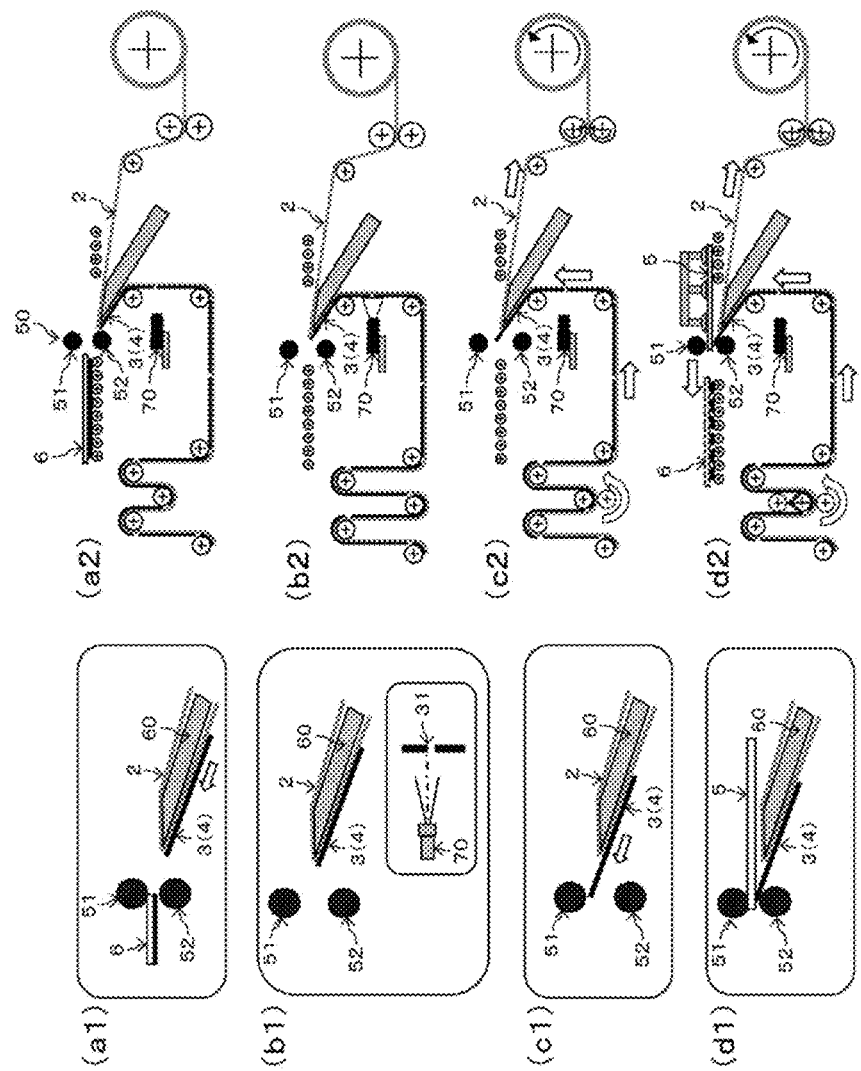
FIG. 5 is a schematic view showing operation steps to read a rear end of an optical film sheet supported on a carrier film positioned at a predetermined detecting position as positional information, and to forwardly feed, based on the positional information, a leading end of the optical film sheet to a predetermined laminating position while peeling the optical film sheet from the carrier film, as shown in FIG. 2.

Another method of manufacturing an optical display device 6 is characterized by operation steps (a) to (d) shown in FIG. 5. A flow chart of an operation step corresponding to FIG. 5 is shown in FIG. 7.

Figure 7:
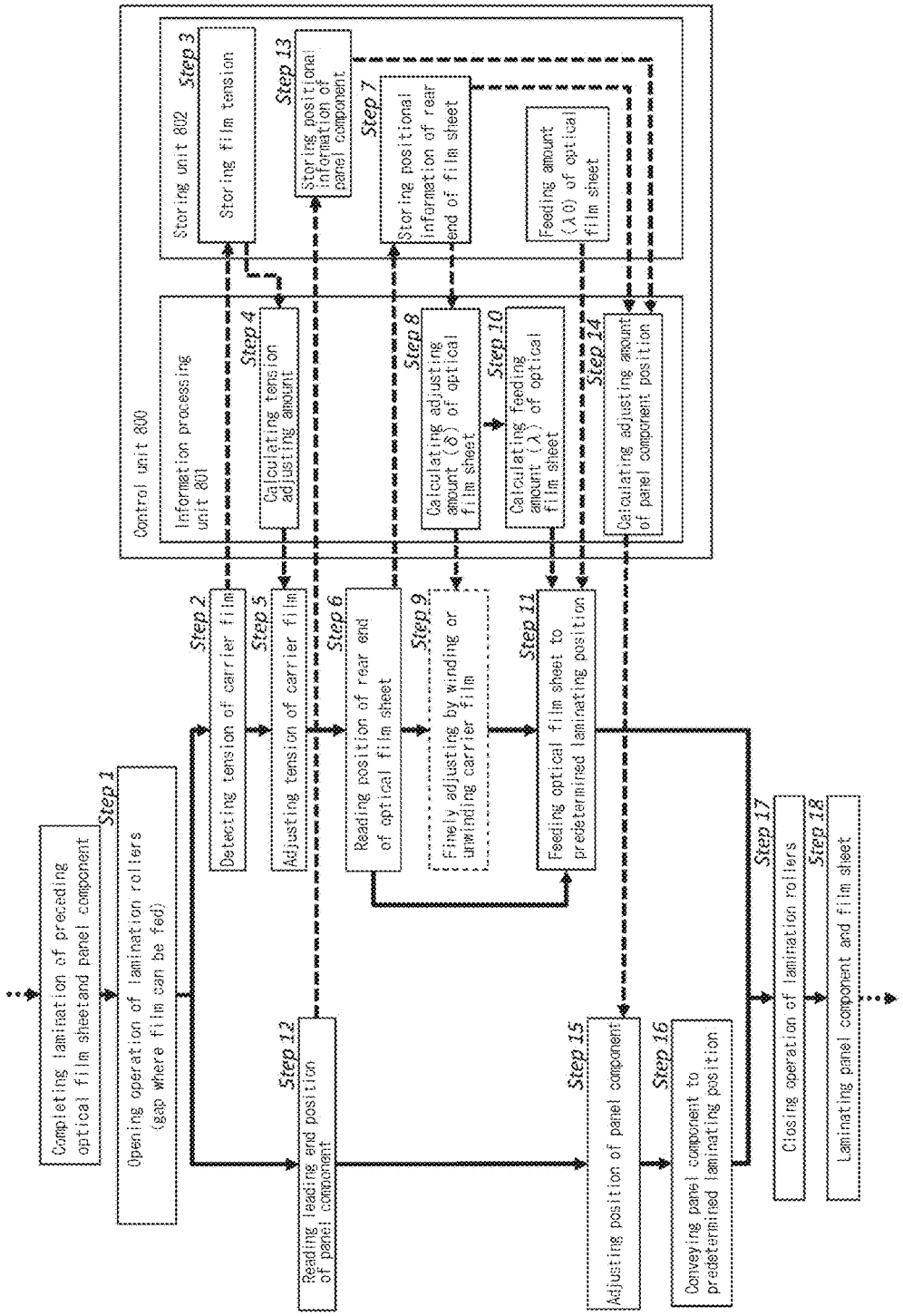
FIG. 7 illustrates a control flow chart representing a manufacturing process of an apparatus for manufacturing an optical display device, by operating lamination rollers configured to laminate and to open/close in upward/downward direction with respect to feeding direction, as shown in FIG. 5.

By the way, since the operation steps (a1) and (a2) shown in FIG. 5 are what shown in FIG. 4, and the steps 1 to 5 shown in FIG. 7 are what shown in FIG. 6, overlapping descriptions associated with those steps will be waived hereafter.

The embodiment of the present invention shown in FIG. 4 and another embodiment of the present invention shown in FIG. 5 are different in respective technical features, as is clear from operation step (c1) shown in FIG. 4 and operation step (b1) shown in FIG. 5, depending on whether a leading end 32 of an optical film sheet 3 has arrived at a space 400 of a predetermined laminating position 100 or it is stopped at a tip-end 61 of a peeling member 60, when a rear end 31 of the optical film sheet 3 is read by a detecting unit 70.

That is, the former is characterized in that:
(1) when laminating operation of a preceding optical film sheet 3 and a preceding panel component 5 is completed and a leading end 32 of the optical film sheet 3 is moved to a space 400 formed at a predetermined laminating position by opening operation of lamination rollers 51, 52 configuring a laminating unit 50;
(2) a rear end 31 of the optical film sheet 3 is read by a detecting unit 70 as positional information 310;
(3) adjusting amount ($\delta$) of imaging devices 71, 72 included in the detecting device from measurement reference 700 is calculated based on the positional information 310; and
(4) by finely adjusting feeding of the carrier film 2 based on the adjusting amount ($\delta$), the leading end 32 of the optical film sheet 3 is properly positioned at a predetermined laminating position 100.

Whereas, the latter is characterized in that:
(1) when laminating operation of a preceding optical film sheet 3 and a preceding panel component 5 is completed, and before a leading end 32 of the optical film sheet 3 is moved to a space 400 formed at a predetermined laminating position by opening operation of lamination rollers 51, 52 configuring a laminating unit 50;
(2) a rear end 31 of the optical film sheet 3 is read by a detecting unit 70 as positional information 310;
(3) adjusting amount ($\delta$) of imaging devices 71, 72 included in the detecting device from measurement reference 700 is calculated based on the positional information 310;
(4) by finely adjusting feeding of the carrier film 2 based on the adjusting amount ($\delta$), the rear end 31 of the optical film sheet 3 is properly positioned at a predetermined detecting position 200; and further,
(5) the leading end 32 of the optical film sheet 3 is forwardly fed to the predetermined laminating position 100 while peeling the optical film sheet 3 from the carrier film 2 by winding operation of the carrier film 2 based on feeding amount ($\lambda_0$) between the leading end 32 of the optical film sheet 3 and the predetermined laminating position 100.

In the latter case, however, the feeding amount ($\lambda_0$) is constant. This is, the feeding amount ($\lambda_0$) corresponds to difference between a distance (Z) from the predetermined laminating position 100 to the predetermined detection position 200 and a length (L) in feeding direction of the optical film sheet 3.

Further in the latter case, the feeding amount ($\lambda$) between the leading end 32 of the optical film sheet 3 and the predetermined laminating position 100 may be directly calculated based on the adjusting amount ($\delta$) and the carrier film 2 may be wound based on the feeding amount ($\lambda$) without positioning the rear end 31 of the optical film sheet 3 to the predetermined detecting position 200. The feeding amount ($\lambda$) in this case is a variable based on ($\delta$).

As is clear from technical features of both cases, timing to read the rear end 31 of the optical film sheet 3 is when the leading end 32 of the optical film sheet 3 is forwardly fed to the predetermined laminating position 100 in the former case, whereas, it is before operation of forwardly feeding the leading end 32 of the optical film sheet 3 to the predetermined laminating position 100 in the latter case.

In the former case, feeding of the carrier film may be finely adjusted with the adjusting amount ($\delta$) calculated based on the positional information of the rear end 31 of the optical film sheet 3, thereby the leading end 32 of the optical film sheet 3 may be properly positioned to the predetermined laminating position 100. Thus, in laminating operation of the optical film sheet 3 and the panel component 5, the panel component 5 is conveyed by the panel component conveying unit 90 toward the optical film sheet 3 positioned at the predetermined laminating position 100.

In the latter case, feeding of the carrier film may be finely adjusted with the adjusting amount ($\delta$) calculated based on the positional information of the rear end 31 of the optical film sheet 3, thereby the leading end 32 of the optical film sheet 3 may be properly positioned to the predetermined laminating position 100, then the carrier film 2 is wound for the feeding amount ($\lambda_0$) between the leading end 32 of the optical film sheet 3 and the predetermined laminating position 100, and thereby the leading end 32 of the optical film sheet 3 is properly positioned to the predetermined laminating position 100. Thus, since it is not necessary to forwardly feed the leading end 32 of the optical film sheet 3 to the predetermined laminating position 100, process management of laminating operation may be more freely set than the former case when, for example, feeding of the optical film sheet 3 and the panel component 5 in synchronization or feeding them one after another without synchronization to the predetermined laminating position 100.

Further in the latter case, the feeding amount ($\lambda$) based on the adjusting amount ($\delta$) may be calculated without finely adjusting feeding of the carrier film 2 for the adjusting amount ($\delta$), thereby the leading end 32 of the optical film sheet 3 may be properly positioned to the predetermined laminating position 100 while peeling the optical film sheet 3 from the carrier film 2 by winding the carrier film 2.

When two variations related with the latter case are described based on the control flow chart shown in FIG. 7, the rear end 31 of the optical film sheet 3 read in the step 6 is stored in the storing unit 802 as the positional information 310 in the step 7. Then, the adjusting amount ($\delta$) shown in FIG. 8 is calculated based on the positional information 310 in the step 8.

The first variation is characterized in that feeding of the carrier film 2 is finely adjusted in the step 9, and in the step 11, the leading end 32 of the optical film sheet 3 is positioned to the predetermined laminating position 100 based on the feeding amount ($\lambda_0$) of the optical film sheet 3 stored in advance in the storing unit 802. On the other hand, the second variation is characterized in that, without processing through the step 9 which is a step for finely adjusting feeding of the carrier film 2, the feeding amount ($\lambda$) based on the adjusting amount ($\delta$) is calculated in the step 10, and the leading end 32 of the optical film sheet 3 is positioned to the predetermined laminating position 100 based on the feeding amount ($\lambda$) calculated in the step 11.

In either case, the steps 12 to 15 related with handling the panel component 5 at the predetermined waiting position 300 are common, the panel component 5 is conveyed to the predetermined laminating position 100 by the panel component conveying unit 90 in the step 16, the laminating unit 50 is switched to active with closing operation of the lamination rollers 51, 52 in the step 17 and laminating operation with the optical film sheet 3 is started in the step 18.

Figure 9:
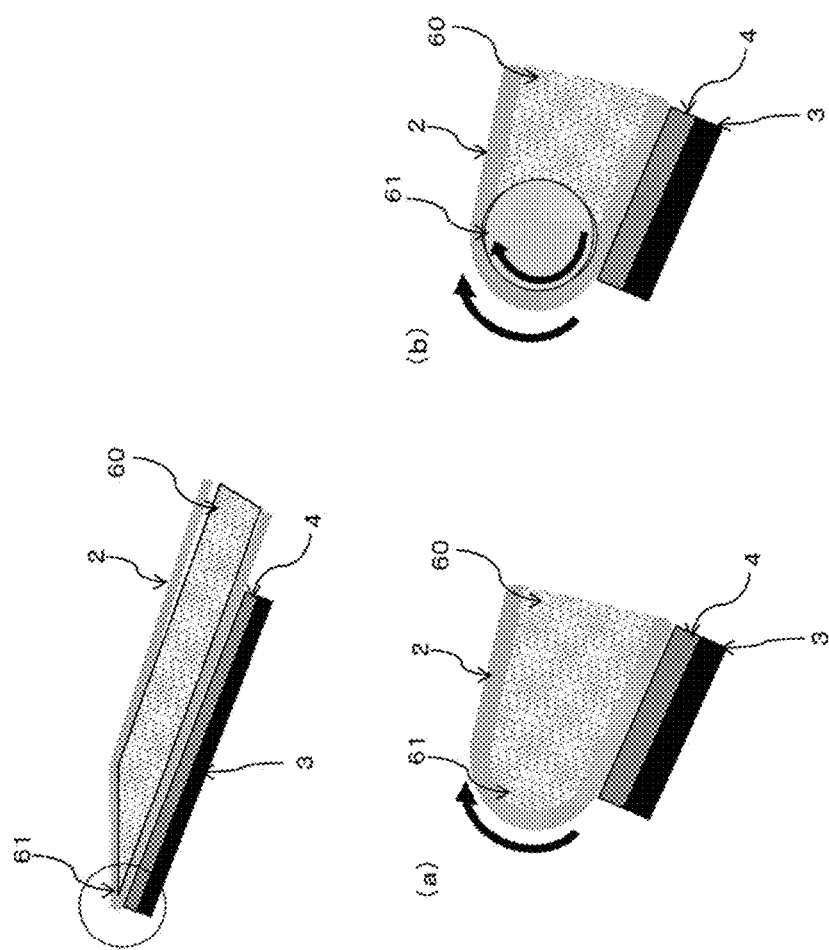
FIG. 9 is a schematic view showing radius of curvature R and rotating structure of a tip-end configuring a head portion of a peeling member

FIG. 9 is a schematic view showing a structure of a tip-end 61 configuring a peeling member 60. As described in detail below, a radius of curvature R in a structure of the tip-end 61 is determined by a relationship between a thickness X of an optical film sheet 3 and a peeling force Z of a carrier film 2 against an adhesive layer 4 such that flexural reactive force of the optical film sheet 3 is greater than the peeling force Z of the carrier film 2 against the adhesive layer 4. Tension of the carrier film 2 under winding or unwinding, one side of which is folded to inside at the tip-end 61, generates difference between at upstream and at downstream of the tip-end 61 depending on setting of the radius of curvature R. Therefore, the radius of curvature R is preferably greater than a certain radius as shown in FIG. 9(*a*), or is that of a rotating structure as shown in FIG. 9(*b*).
(Calculation of Radius of Curvature R of Tip-End 61 of Peeling Member 60)

An optical film laminate 1 consists of a plurality of optical film sheets 3 continuously supported on one of opposite surfaces of a long web of a carrier film 2 via an adhesive layer 4. The plurality of the optical film sheets 3 continuously supported on the carrier film 2 are gradually peeled starting from the leading end 31 from the carrier film 2 together with the adhesive layer 4 under peeling action of the peeling body 60 having the tip-end 61 abutting to another surface, i.e., the rear surface of the carrier film 2 because, in particular, when the tip end 61 arrives at a position corresponding to the back side of slit lines which form the plurality of the optical film sheets 3 supported on the carrier film 2 with the adhesive layer 4 by winding the optical film laminate 1 without slacking the optical film laminate 1 which is passed around the pealing member 60, the reactive force from flexural rigidity of the optical film sheet 3 with the tip-end 61 having radius of curvature R becomes greater than the peeling force of the carrier film 2 against the adhesive layer 4. What is described in the above depends on the relative relationship between the radius of curvature R of the tip-end 61, the thickness X of the optical film sheet 3, and the peeling force Z of the carrier film 2 against the adhesive layer 4. In the following experimental system, the optical film sheet 3 is referred as "substrate".

Figure 10:
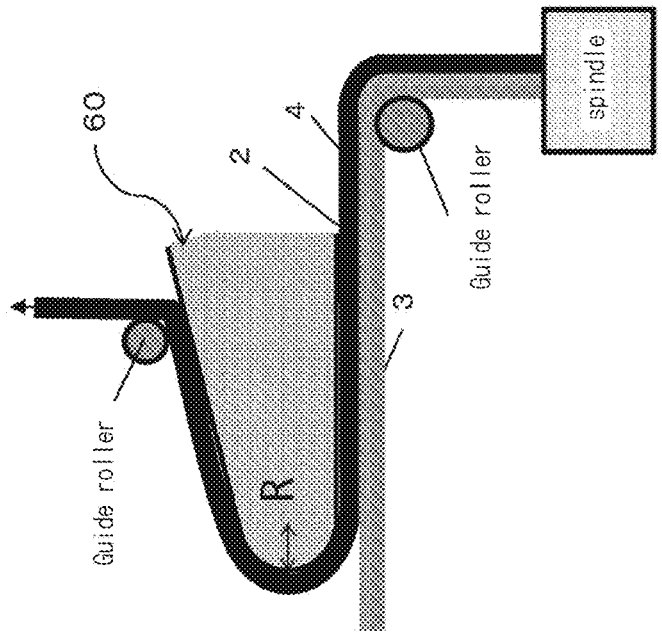
FIG. 10 is a view showing one example of an experimental system for determining radius of curvature R of cross-sectionally arc-shaped surface of a peeling member based on a relative relationship between a flexural reactive force of a substrate depending on a thickness of an experimental substrate which corresponds to an optical film sheet, and a peeling force of a carrier film against an adhesive layer of the substrate.
Figure 10:
Figure 10:
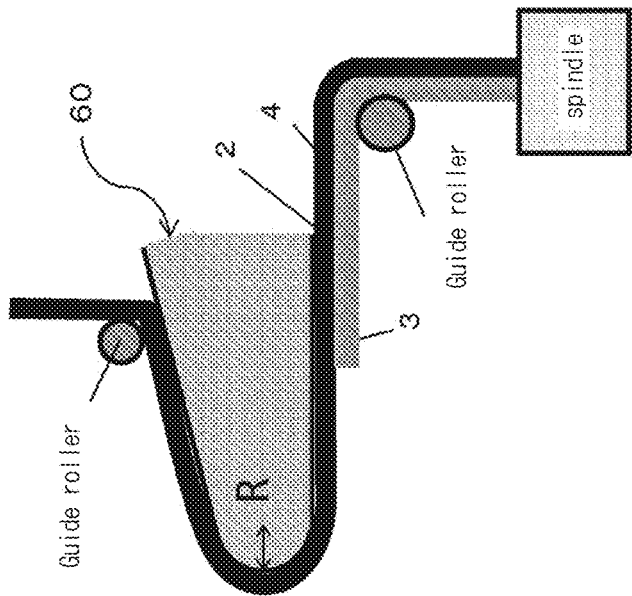

The radius of curvature R of the tip-end 61 of the peeling member 60 is determined based on the relative relationship between the thickness X of the substrate and the peeling force Z of the optical film sheet 3 against the adhesive layer 4. One example of the relative relationship is described below. FIG. 10 shows an experimental system performed.

As shown in the left diagram in FIG. 10, there is provided an optical film laminate 1 comprising a carrier film 2 and a substrate 3 having a longitudinal length shorter than the carrier film 2 and releasably laminated to the carrier film 2 via an adhesive layer 4, a rear surface of the carrier film 2 abutted against a tip end 61 having a radius of curvature R at a tip of a peeling member 60, the optical film laminate 1 being passed around the tip-end 61 of the peeling member 60 such that a border of a portion where the carrier film 2 and the substrate 3 having the adhesive layer 4 are laminated, and a portion of the carrier film 2 without the substrate are positioned at upstream of the tip end 61 with the radius of curvature R, and an end portion of the carrier film 2 without the substrate which the tip-end 61 abuts to the rear surface thereof is folded by a guide roller and upwardly pulled at a constant rate.

Thus, as shown in the right diagram in FIG. 10, when the border between the portion where the carrier film 2 and the substrate 3 having the adhesive layer 4 are laminated, and the portion of the carrier film 2 without the substrate arrive at the tip-end 61 with the radius of curvature R of the peeing member 60, the substrate may or may not be peeled from the carrier film 2 depending on the relationship between the reactive force from the flexural rigidity of the substrate 3 and the peeling force of the carrier film 2 against the adhesive layer 4, i.e., depending on the length of R. It is tested whether or not the substrate 3 is peeled at the peeling point when the radius of curvature R of the tip-end 61 is varied.

Figure 12:
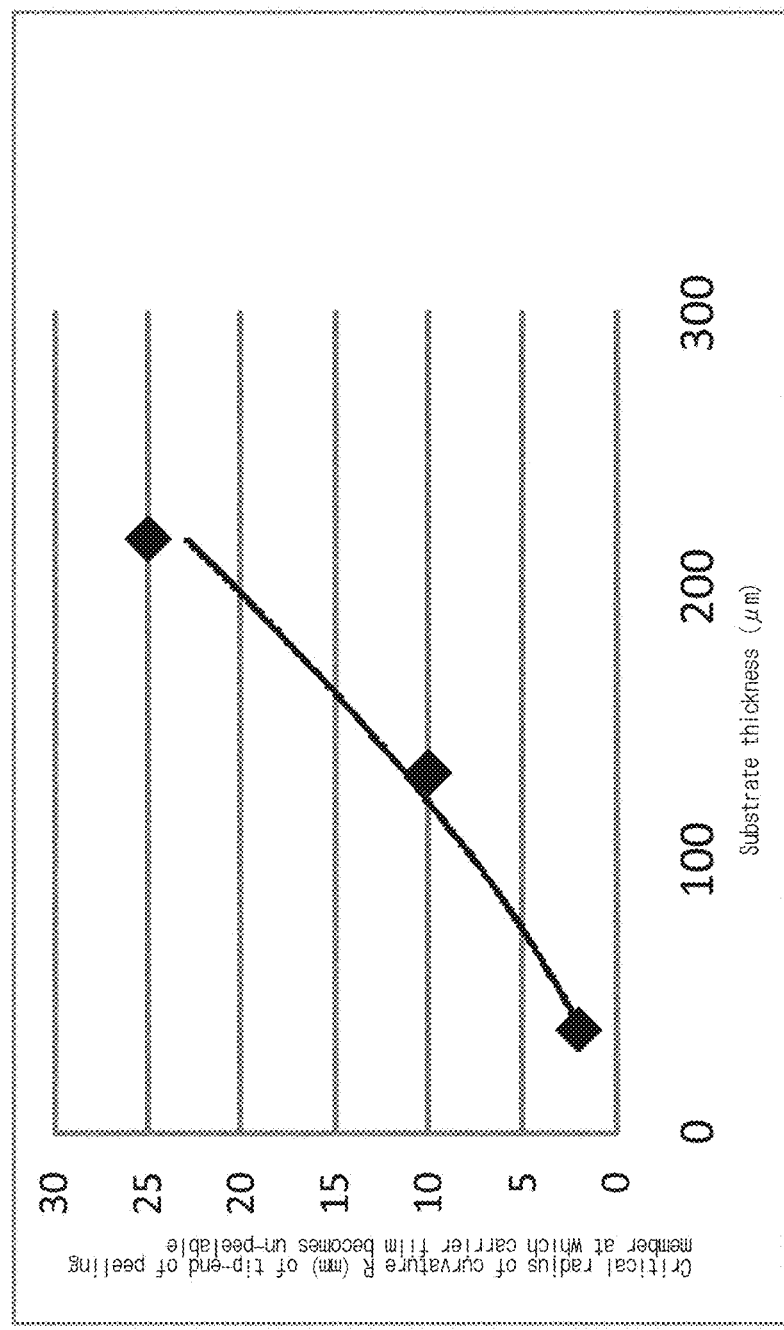
FIG. 12 is a graph plotting a relationship between a thickness of a substrate with an adhesive layer and a critical R incapable of causing peeling.

Reference is now made to FIG. 11. It is tested as to whether or not the substrate 3 is peeled by classifying the verified substrates to one completely peeled, one which the substrate 3 having the peeled adhesive layer 4 was dragged obliquely upward by the carrier film 2 and not completely peeled, and one which was not peeled. FIG. 12 shows the test results. The three substrates used in the test were VEGQ 1723 NTB (thickness: 213 µm) and CIG 1484 CVAG 350 (thickness: 131 µm) of Nitto Denko Corporation, and PET T-390 (thickness: 38 μm) of Mitsubishi Plastics, Inc, each having a width of 50 mm, considering difference in rigidity (thickness). The thickness X is a value of an optical film sheet which an adhesive layer 4 is not formed thereon. Although flexural rigidity is derived from elastic modulus of the substrate 3, films for use in liquid-crystal display devices are generally made of synthetic resin, and there is not a significant difference in elastic modulus of the films. Therefore, degree of flexural rigidity is generally determined by the thickness of the substrate.

In the test, a weight of 1 kg/50 mm was attached to a lower end of the optical film laminate 1 in order to apply tension, as shown in FIG. 10. A 180-degree peeling force of the carrier film 2 against the adhesive layer 4 was in a range of 0.05 to 0.15 [N/50 mm]. In the test, conveying speed was 0.6 [m/min]. Values of R [mm] at which peeling was failed are plotted for the thicknesses X of the substrate 3 in a range of 1 to 25 mm.

As is clear from FIG. 11, the substrate 3 with a thickness of 213 μm was completely peeled when the radius of curvature R was or less than 22.5 mm, however, it was not peeled or not completely peeled when the radius of curvature R was 25.0 mm. The substrate 3 with a thickness of 131 μm was completely peeled when the radius of curvature R was or less than 7.5 mm, however, it was not peeled or not completely peeled when the radius of curvature R was 10.0 mm. The substrate 3 with a thickness of 38 μm was completely peeled when the radius of curvature R was or less than 1.5 mm, however, it was not peeled or not completely peeled when the radius of curvature R was 2.0 mm. FIG. 12 shows the relationship between thickness X of the substrate 3 and critical R at which the substrate 3 does not peel. Specifically, the substrate 3 having an adhesive layer 4 cannot be peeled when it is in a region above the line in FIG. 12. On the other hand, the substrate 3 having an adhesive layer 4 can be peeled if it is in a region below the line. In other words, this line is a threshold as to whether the substrate can or cannot be peeled.

Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and it is intended that the present invention encompasses all embodiments which belong to claims.

EXPLANATION OF NUMERICAL CHARACTERS

1: Optical film laminate
2: Carrier film
3: Optical film sheet
31: Rear end of optical film sheet
32: Leading end of optical film sheet
310: Positional information of rear end
311, 312: Positional information of opposing edges of rear end of optical film sheet
4: Adhesive layer included in optical film sheet
5: Panel component
500: Laminating surface of panel component
6: Optical display device
10: Apparatus for manufacturing optical display device
50: Laminating unit
51, 52: Lamination rollers
60: Peeling member
61: Tip-end of peeling member
70: Detecting unit
71, 72: Imaging unit
700: Measurement reference
80: Carrier film feeding unit
81, 82: Forward/reverse feed rollers
83: Dancer roller
100: Predetermined laminating position
200: Predetermined detecting position
300: Predetermined waiting position
400: Space
500: Lamination-start position
800: Controlling unit
801: Information processing unit
802: Storing unit
900: Slitting unit

The invention claimed is:

1. A method for manufacturing an optical display device by sequentially peeling a plurality of optical film sheets together with an adhesive layer, the optical film sheets being continuously supported on one of opposite surfaces of a long web of a carrier film via an adhesive layer which configures an optical film laminate from the carrier film, and laminating the plurality of optical film sheets to one of opposite surfaces of respective ones of a plurality of panel components via the adhesive layer by using a laminating unit at a predetermined laminating position, the method comprising:

a feeding step of optical film sheet to forwardly feed the optical film sheet to the predetermined laminating position while peeling the optical film sheet together with the adhesive layer from the carrier film, under winding operation of the carrier film in a state where another surface thereof being folded to inside at a tip-end configuring a head portion of a peeling member having the tip-end provided in vicinity of the predetermined laminating position and the carrier film being passed around the peeling member and under peeling action of the peeling member;

a rear end reading step of optical film sheet to read a rear end of the optical film sheet supported on the carrier film as positional information by using a detecting means located upstream of the peeling member for detecting the rear end of the optical film sheet supported on the carrier film;

a conveying step of panel component to forwardly feed the panel component to be laminated to the optical film sheet from a predetermined waiting position to the predetermined laminating position, based on the positional information; and a laminating step of laminating the optical film sheet and the panel component via the adhesive layer by the laminating unit at the predetermined laminating position, while peeling the optical film sheet together with the adhesive layer from the carrier film under winding operation of the carrier film and peeling action of the peeling member, forwardly feeding to the predetermined laminating position, and positioning a leading end of the optical film sheet at the predetermined laminating position, based on the positional information.

2. The method according to claim 1, characterized in that the method further comprises a step of, at the predetermined laminating position, switching the laminating unit to nonactive after completing laminating operation of the optical film sheet and the panel component, and switching the laminating unit to active when next laminating operation of the optical film sheet and the panel component is started.

3. The method according to claim 1, characterized in that the panel component is rectangular-shaped and has a laminating surface in which at least an edge is left in a long side and/or a short side of the panel component on a surface to be laminated to the optical film, and the method further comprises a step of matching one side of the laminating surface which is to be a lamination start position of the panel component to the leading end of the optical film sheet positioned at the predetermined laminating position when the panel component arrives to the predetermined laminating position.

4. The method according to claim 1, characterized in that the method further comprises a step of synchronizing conveying operation of a panel component to forwardly feed the panel component to the predetermined laminating position and winding operation of a carrier film to forwardly feed the optical film sheet to the predetermined laminating position.

5. The method according to claim 2, characterized in that the laminating unit comprises at least a pair of lamination rollers which open/close in upward/downward direction, wherein a space is formed by opening operation of the lamination rollers as well as the laminating unit is switched to non-active after completing laminating operation of the optical film sheet and the panel component, and the space is closed by closing operation of the lamination rollers as well as the laminating unit is switched to active when starting next laminating operation of the optical film sheet and the panel component.

6. The method according to claim 1, characterized in that a carrier film feeding means comprising forward/reverse feed rollers and being arranged at upstream and at downstream of the tip-end of the peeling member is operated to wind the carrier film without slacking.

7. The method according to claim 1, characterized in that the detecting means is operated to read opposing edges of the rear end of the optical film sheet supported on the carrier film.

8. The method according to claim 7, characterized in that the detecting means comprises a plurality of imaging devices having a measurement reference specifying a position of each of the opposing edges, and the imaging devices are operated to generate positional information of the opposing edges which the rear end of the optical film sheet supported on the carrier film has, based on the measurement reference.

9. The method according to claim 1, characterized in that the method further comprises a step where the carrier film feeding means forwardly or backwardly feed the rear end of the optical film sheet supported on the carrier film by winding or unwinding operation of the carrier film without slacking, based on the positional information.

10. The method according to claim 1, characterized in that a panel component detecting means is provided at the predetermined waiting position to detect the panel component conveyed to the predetermined waiting position.

11. The method according to claim 1, characterized in that a panel component position adjusting means is provided at the predetermined waiting position to adjust position and posture of the panel component at the predetermined waiting position.

12. An apparatus for manufacturing an optical display device by sequentially peeling a plurality of optical film sheets continuously supported on one of opposite surfaces of a long web of a carrier film via an adhesive layer which configures an optical film laminate from the carrier film together with the adhesive layer, and laminating the plurality of optical film sheets to one of opposite surfaces of respective ones of a plurality of panel components via the adhesive layer at a predetermined laminating position, the apparatus comprising:

a laminating unit arranged at the predetermined laminating position and operating to laminate the optical film sheet to one of opposite surfaces of the panel component via the adhesive layer;

a peeling member arranged adjacent to the laminating unit in vicinity of the predetermined laminating position and consisting of a tip-end configuring a head-portion which acts to forwardly feed the optical film sheet to the predetermined laminating position while peeling the optical film sheet together with the adhesive layer from the carrier film by winding operation of the carrier film, and a body where another surface of the carrier film is folded to inside and passed therearound;

a carrier film feeding unit operating to wind the carrier film in a state where another surface thereof is folded to inside at the tip-end and passed around the body, without slacking;

a detecting unit arranged at a predetermined detecting position set at upstream of the tip-end in feeding of the optical film laminate and operating to read a rear end of the optical film sheet supported on the carrier film as positional information associated with winding operation of the carrier film;

a panel component conveying unit operating to forwardly feed the panel component from a predetermined waiting position to the predetermined laminating position, based on the positional information detected by the detecting unit; and a control unit operating to associate each of the laminating unit, the carrier film feeding unit, the detecting unit, and the panel component conveying unit, to forwardly feed the optical film sheet and position a leading end of the optical film sheet at the predetermined laminating position based on the positional information of a rear end of the optical film sheet while peeling the optical film sheet together with the adhesive later from the carrier film under winding operation of the carrier film and peeling action of the peeling member and operating to laminate the optical film sheet and the panel component via the adhesive layer by the laminating unit at the predetermined laminating position.

13. The apparatus according to claim 12, characterized in that the panel component is rectangular-shaped and has a laminating surface in which at least an edge is left in a long side and/or a short side of the panel component on a surface to be laminated to the optical film, and the control unit operates to match a long side or a short side of the laminating surface which is to be a lamination start position of the panel component to the leading end of the optical film sheet positioned at the predetermined laminating position when the panel component arrives to the predetermined laminating position.

14. The apparatus according to claim 12, characterized in that the laminating unit comprises at least a pair of lamination rollers which open/close in upward/downward direction, and the control unit operates to form a space by opening operation of the lamination rollers as well as to switch the laminating unit to non-active after completing laminating operation of the optical film sheet and the panel component, and to close the space by closing operation of the lamination rollers as well as to switch the laminating unit to active when starting next laminating operation of the optical film sheet and the panel component.

15. The apparatus according to claim 12, characterized in that the control unit operates the carrier film feeding unit based on positional information of a rear end of the optical film sheet which is read by the detecting unit, thereby to position the leading end of the optical film sheet to the predetermined laminating position by forwardly or backwardly feeding the optical film by winding or unwinding the carrier film.

16. The apparatus according to claim 12, characterized in that the control unit interlockingly operates the carrier film feeding unit and the panel component conveying unit to synchronize operation of forwardly feeding the optical film sheet to the predetermined laminating position and operation of forwardly feeding the panel component to the predetermined laminating position.

17. The apparatus according to claim 12, characterized in that the carrier film feeding unit is configured with forward/reverse feed rollers arranged at upstream and at downstream of the tip-end of the peeling member, and the control unit interlockingly operates the forward/reverse feed rollers to wind or unwind the carrier film without slacking.

18. The apparatus according to claim 17, characterized in that a dancer roller is arranged between the peeling member and one of the forward/reverse feed rollers in the carrier film feeding unit configured with one of the forward/reverse feed rollers, the peeling member and the other of forward/reverse feed rollers, and the dancer roller cooperates with the other of the forward/reverse feed rollers to wind or unwind the carrier film without slacking.

19. The unit according to claim 12, characterized in that the detecting unit comprises a plurality of imaging devices having a measurement reference arranged at a position corresponding to opposing edges of a rear end face of the optical film sheet supported on the carrier film, and the control unit operates the imaging devices to generate the opposing edges as positional information based on the measurement reference.

20. The unit according to claim 12, characterized in that a panel component detecting unit is arranged at the predetermined waiting position, and the control unit operates the panel component detecting unit to detect the panel component conveyed to the predetermined waiting position.

21. The apparatus according to claim 12, characterized in that a panel component position adjusting unit is arranged at the predetermined waiting position, and the control unit operates the panel component position adjusting unit to pre-adjust position and posture of the panel component conveyed to the predetermined laminating position by the panel component conveying unit at the predetermined waiting position.

* * * * *